United States Patent
Carmichael et al.

(10) Patent No.: US 7,464,344 B1
(45) Date of Patent: Dec. 9, 2008

(54) SYSTEMS AND METHODS FOR IMMERSIVE ADVERTISING

(76) Inventors: Connie Carmichael, 27411 Westridge La., Laguna Hills, CA (US) 92659;
Chris Carmichael, 27411 Westridge La., Laguna Hills, CA (US) 92659; Greg Crotty, 4 Monnett Ct., Morris Planes, NJ (US) 07950

( * ) Notice: Subject to any disclaimer, the term of this patent is extended or adjusted under 35 U.S.C. 154(b) by 719 days.

(21) Appl. No.: 09/638,304

(22) Filed: Aug. 14, 2000

(51) Int. Cl.
*G06F 15/00* (2006.01)
*G06F 13/00* (2006.01)

(52) U.S. Cl. .......................... 715/854; 715/747

(58) Field of Classification Search ............... 345/747, 345/744, 745, 760, 730, 732, 731, 716, 719, 345/720, 723, 726, 850, 848, 851, 854; 705/14, 705/27, 26; 715/501–1, 515, 514, 526, 530, 715/744–747, 716–732, 848–854
See application file for complete search history.

(56) References Cited

U.S. PATENT DOCUMENTS

| | | | | |
|---|---|---|---|---|
| 5,493,490 A | * | 2/1996 | Johnson | 705/26 |
| 5,850,352 A | | 12/1998 | Moezzi et al. | 364/514 A |
| 5,959,623 A | * | 9/1999 | van Hoff et al. | 345/719 |
| 5,963,670 A | | 10/1999 | Lipson et al. | 382/224 |
| 6,304,855 B1 | * | 10/2001 | Burke | 705/27 |
| 6,580,441 B2 | * | 6/2003 | Schileru-Key | 345/854 X |
| 2002/0026388 A1 | * | 2/2002 | Roebuck | 705/27 |
| 2002/0059395 A1 | * | 5/2002 | Liou | 705/26 X |

* cited by examiner

*Primary Examiner*—Cao Nguyen
(74) *Attorney, Agent, or Firm*—Law Office SC Harris

(57) ABSTRACT

The invention is directed to systems and Methods for immersive advertising on a wide area network, such as the Internet or World Wide Web. Immersive advertisements are customized presentations developed and imbedded within the body of web content. They can take the form of non-static images imbedded within a configurable primary image model or they can be a non-configurable, highly stylized, and animated component imbedded within the content of a web page.

43 Claims, 11 Drawing Sheets

SYSTEMS AND METHODS FOR IMMERSIVE ADVERTISING

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is directed to improved systems and methods for advertising and, in particular, to improved systems and methods for immersive advertising on a wide area computer network such as the Internet or World Wide Web.

BACKGROUND OF THE INVENTION

The substantial deployment of fiber optics by telephone and cable television companies has created an infrastructure capable of transmitting billions of bits of data per second through these networks. Advancements in digital video compression technologies further make it practical to digitize and send high-quality full motion video in addition to audio, text and graphics over these networks.

The confluence of digital signal processing, microelectronics and electro-optic technologies will permit the deployment of interactive switched digital broadband networks and the distribution of two-way, real-time, interactive programming and services. As the cost of data storage and processing is reduced, these networks will become increasingly cost effective, providing unlimited opportunities for businesses to develop new products and services and to deliver their current offerings more efficiently.

As the Internet has emerged into a global marketplace over the past decade, numerous companies have attempted to advertise and sell their respective products using the Internet and, in particular, the World Wide Web. This marketing usually falls into one of two categories, either placing "banner advertisements" on a particular web page or using an entire web page or web site as an advertisement.

A banner ad is a small advertisement placed on, but discrete from the content of, a web page. Typically, these ads are clickable, meaning they provide a hypertext link to the page being advertised. Banner ads are advantageous because they can be placed on web pages with a large number of visitors or on web pages with a particular type of visitor. However, banner ads are typically static and unsophisticated and, thus, go unnoticed. Additionally, when noticed, banner ads are often seen as disruptive and unwanted because they are not integrated with the web page content.

The second category of advertising includes web pages or even entire web sites that serve as advertisements. An example of this type of online advertising is the catalog web site. These sites are very similar to an actual catalog, offering pictures, descriptions and prices for the goods or services along with a means for purchasing the goods or services. While this type of advertising offers the advantage of focusing the visitor's attention on the advertising content, the sites are usually only accessed by visitors intentionally looking for specific information about the goods or services advertised on the web page. Thus, the number of visitors tends to be low, and these visitors are rarely potential new customers. Instead, the web site merely services existing customers.

Therefore, a strong need exists for a method of advertising that can be integrated with the content of a high traffic web site without being intrusive and that can increase sales by attracting new potential customers. A further need exists for methods of online advertising that involve the consumer and that require real-time consumer input and interaction, therefore enhancing the user's experience with the product or service being advertised.

SUMMARY OF THE INVENTION

Immersive advertisements are customized presentations developed and embedded within the body of web content. Rather than distracting a user when the user visits a web site, this form of advertising actually enhances the imagery presented to the user and provides him or her with information and entertainment. Furthermore, the methods and systems described herein enable the user to experience a more intimate and personal connection with the product or service, because the user is involved in customizing the product or service as well as the ad showcasing the product or service. Moreover, the methods and systems described herein enable the user to direct and interact with the advertisement in real-time.

In a preferred embodiment, an immersive advertisement can take the form of non-static images embedded within a primary image model. The non-static images preferably comprise professionally directed and produced presentations, which may be created using multimedia technologies known to those skilled in the art. Additionally, these non-static images may be configurable by a visitor to the web page.

In another preferred embodiment, an immersive advertisement can be a highly stylized, animated component embedded within the content of a web page. In this embodiment, the immersive advertisement would preferably blend into the presentation in a manner that is graphically appropriate.

In yet another preferred embodiment, an immersive advertisement is displayed as a static image in a compilation of images concentrated within a web page. Rather than being discrete, banner type ads, static immersive advertisements are focused on, and blend with, the overall experience or feel of the web site.

In another preferred embodiment, a system for performing immersive advertising may include an advertising sequence, an image database, a graphical user interface (GUI), a presentation web page, an application server and a logic program. The advertising sequence is stored in a memory and includes a plurality of single frame primary image models. These single frame primary image models may be created using numerous available technologies, such as video, film, or still frame photography. The image database contains a plurality of fill images, which can include still frame images or dynamically altered components of the single frame primary image models. The logic program provides a means for a user, via the GUI, to configure the advertising sequence using the image database, wherein the user may select fill images to be displayed within single frame primary image models. The resulting advertising sequence may then be displayed at the presentation web page.

In a preferred method of immersive advertising, which may take place on a wide area computer network such as the Internet or World Wide Web, an advertising sequence is stored in memory. This advertising sequence includes a plurality of single frame primary image models and a plurality of fill images that are configurable within the primary image models. A GUI is provided, which may be a web page that allows a user to selectively configure the fill images within the primary image models. In so doing, the advertising sequence may be customized based upon the user's selective configuration. The advertising sequence may then be displayed on a presentation web page.

In yet another preferred embodiment, a method for advertising products and services over a global computer network is presented. This method involves the use of a networked computer and comprises the step of providing an interactive video clip and delivering it electronically to a consumer terminal. The video clip can comprise three-dimensional data stored in the networked computer and accessible by a remote user.

Further steps include providing a graphical user interface that enables the remote consumer/user to interact with the video clip in real-time. The graphical user interface can enable the user's keyboard or joystick or other input device to start, stop, speed up, slow down, change the perspective of, alter the characters or products used in, or alter the scenery involved in an interactive advertisement. The video clip can comprise digitized video-taped or filmed images as well as computer generated or hand drawn and digitized images displayed in rapid sequence frames.

Another step involved in this method is to provide a searchable database of products and services, and to enable the consumer to mix and match products and services by choosing different products and services from the database. This method allows the consumer to dynamically create a customized advertisement, which can be delivered in an interactive setting.

For example, the consumer may be viewing a static advertisement of a Ferrari (Registered Trademark of Ferrari North America or Ferrari S.P.A.). The consumer can load the Ferrari with accessories chosen by the consumer, such as a Sony (Registered Trademark of Sony Corp.) stereo system and Eagle GT (Trademark of Goodyear Tire and Rubber Co.) tires. The consumer can then get into the car and drive it in a virtual environment, which can comprise video images, computer generated images, or a combination of both. The virtual environments can be computer generated images configured with three-dimensional data or digitized video or film shot with 3-D technology. Furthermore, the virtual environment can be created using systems known in the art, which include three-dimensional data, point of view position data, and operable objects controlled by a logic program.

In conjunction with any of the above or any other embodiments or methods of the invention, Virtual Reality Markup Language (VRML) can be used to present full 360 degree images of a selected product. This allows the product to be viewed from all angles and also allows the user to move any "hinged" or otherwise movable components of the product to demonstrate its function.

Furthermore, the product, for example, a new dental drill, can be demonstrated in a three dimensional immersive advertisement that enables a remote user/consumer to handle the virtual drill and use it on a virtual patient in a virtual operation. The perspective of the user/consumer in the three dimensional virtual space can be from the point of view of the virtual dentist conducting the operation. The virtual dentist can be controlled by the user/consumer using methods and systems, such as those described in U.S. Pat. No. 5,973,704 (the entirety of which is incorporated herein by reference). Furthermore, the point of view of the user/consumer can be from a third position in the virtual three dimensional space, so that the user is not only controlling the actions of the virtual dentist, but is viewing the action as a third virtual person.

Also, a Product and Service Descriptor Module can be provided to display the product and all information available including pricing. This module comprises a database of products and services and their specifications. It allows the user to obtain detailed information about the specifications of any product or service included in the database.

DETAILED DESCRIPTION OF THE PREFERRED EMBODIMENTS

Figure 1:
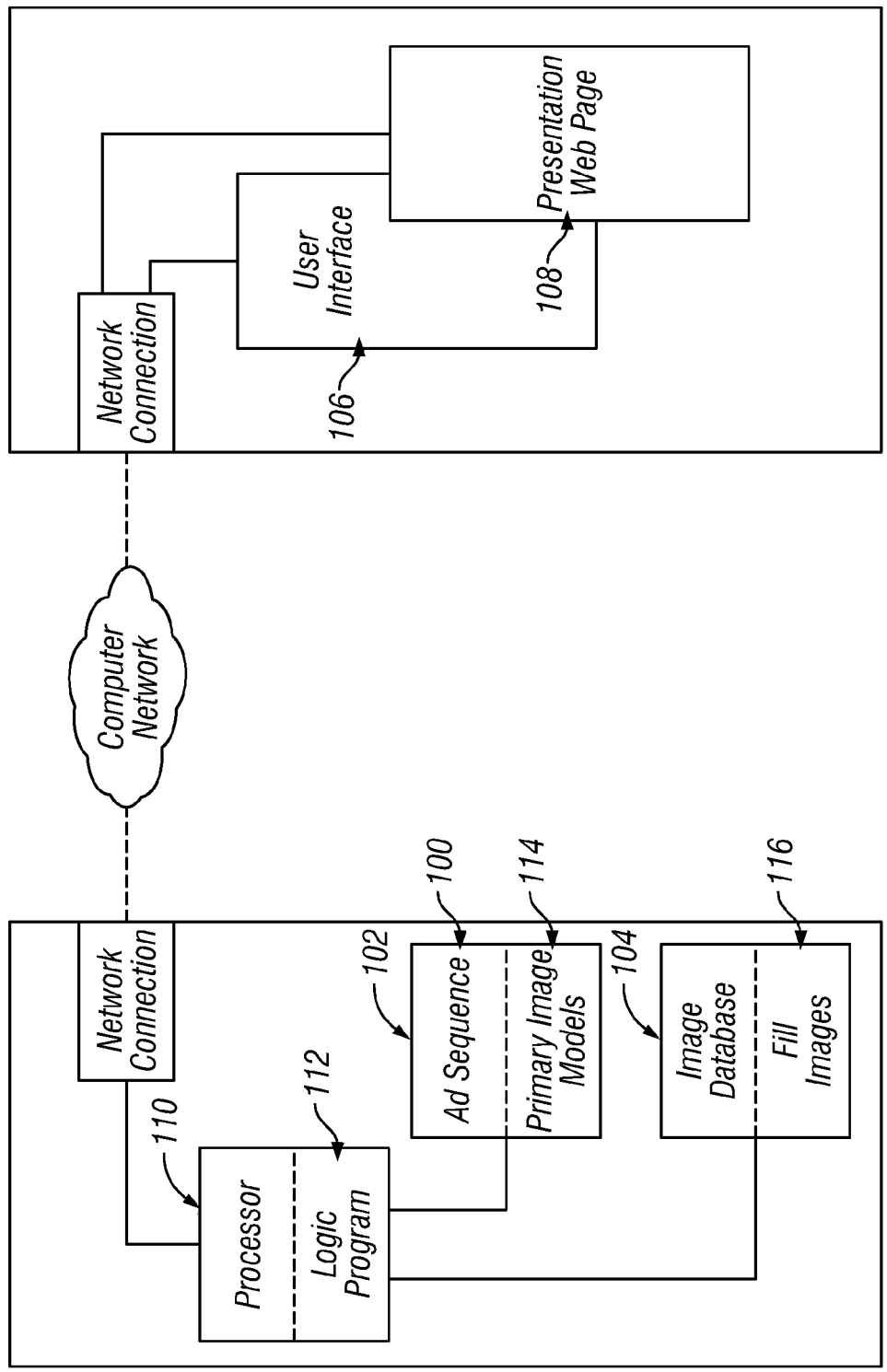
FIG. 1 illustrates the general architecture of a system for performing immersive advertising in accordance with the present invention.

FIG. 1 illustrates the general architecture of a system for performing Immersive advertising in accordance with the present invention. This system may include an advertising sequence 100 stored in a memory 102, an image database 104, a user interface 106, a presentation web page 108, and processor 110 adapted to perform a logic program 112. An application server is in electronic communication with each of the user interface, the memory, and the image database. The advertising sequence includes a plurality of single frame primary image models 114. These single frame primary image models may be created using numerous available technologies, such as video, film, still frame photography, or computer generated imaging (CGI).

The photography sequence is then broken down into single frames for manipulation. It is these single frame images that will comprise the primary image models that serve as the base for the presentation. Within the body of a primary image model, various components such as clothing or background images are manually lifted (removed) from the photograph. This may be accomplished using graphic editing software commonly known to those skilled in the art.

A user can then use the fill images to configure the resulting blank components. The image database contains a plurality of fill images 116, which can include still frame images or dynamically altered components of the single frame primary image models. The logic program 112 provides a means for a user, via the user interface 106, to configure the advertising sequence 100 using the image database 104, wherein the user may select fill images 116 to be displayed within single frame primary image models 114. The single frames are then reassembled and the resulting advertising sequence is displayed at the presentation web page 108. Common applications such as Macromedia's Flash technology or JAVA will be used to present the final stored image on screen. Also, Virtual Reality Markup Language (VRML) can be used to present full 360 degree images of a selected product. This allows the product to be viewed from all angles and also allows the user to move any "hinged" or otherwise movable components of the product to demonstrate its function. The Product and Service Descriptor Module is the component that will display the product and all information available including pricing.

Figure 2:
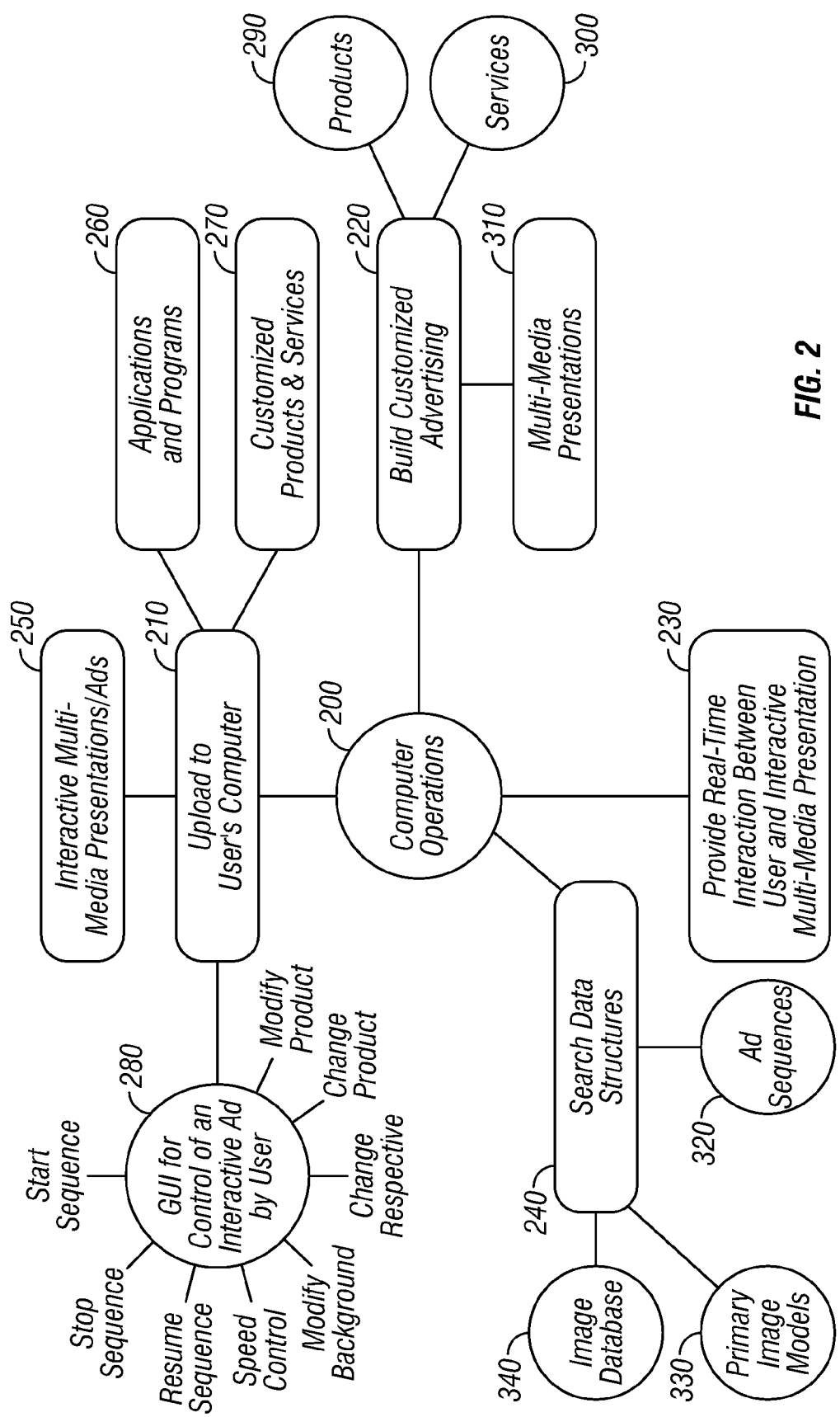
FIG. 2 is a state diagram illustrating an example of operations performed by a computer running software according to one embodiment of the invention.

FIG. 2 illustrates an example of operations performed by a computer running software that enables users/consumers to customize advertising and to view it in an interactive setting. The overall operation 200 of the computer includes: an upload operation 210; a build customized advertising operation 220; a real-time interaction operation 230; and a search data structures operation 240.

The upload operation 210 can upload interactive multimedia presentations 250, other applications and programs 260, customized products and services that are advertised 270, and a graphical user interface 280 that enables a user/consumer to control the interactive advertising 250. The graphical user interface can include the following functions among others: a start sequence function; a stop sequence function; a resume sequence function; a speed control; a modify background function to change the background of the presentation; a change perspective function, which allows the user to view the presentation from a plurality of perspectives; a change product function, which allows the user to introduce different products to the presentation; and a modify product function, which allows the user to modify certain qualities or characteristics of a particular product, such as its color, or other specifications, during the presentation.

The build customized advertising operation 220 draws from various databases of products 290, services 300, and multi-media presentations or advertising sequences 310 to build a visual depiction of a product or service or a multi-media presentation showcasing one or more products or services.

The search data structures operation 240 can search an image database 340, which holds a plurality of images of products, with numerous colors and specifications of any particular product being represented in the database. The search data structures operation 240 can also search primary image models 330, which include outlines or generic iterations, i.e., models of different products. The search data structures operation 240 can further search advertising sequences 320, which can be a sequence of frames that showcase a primary model 330 or a plurality of primary models.

Figure 3:
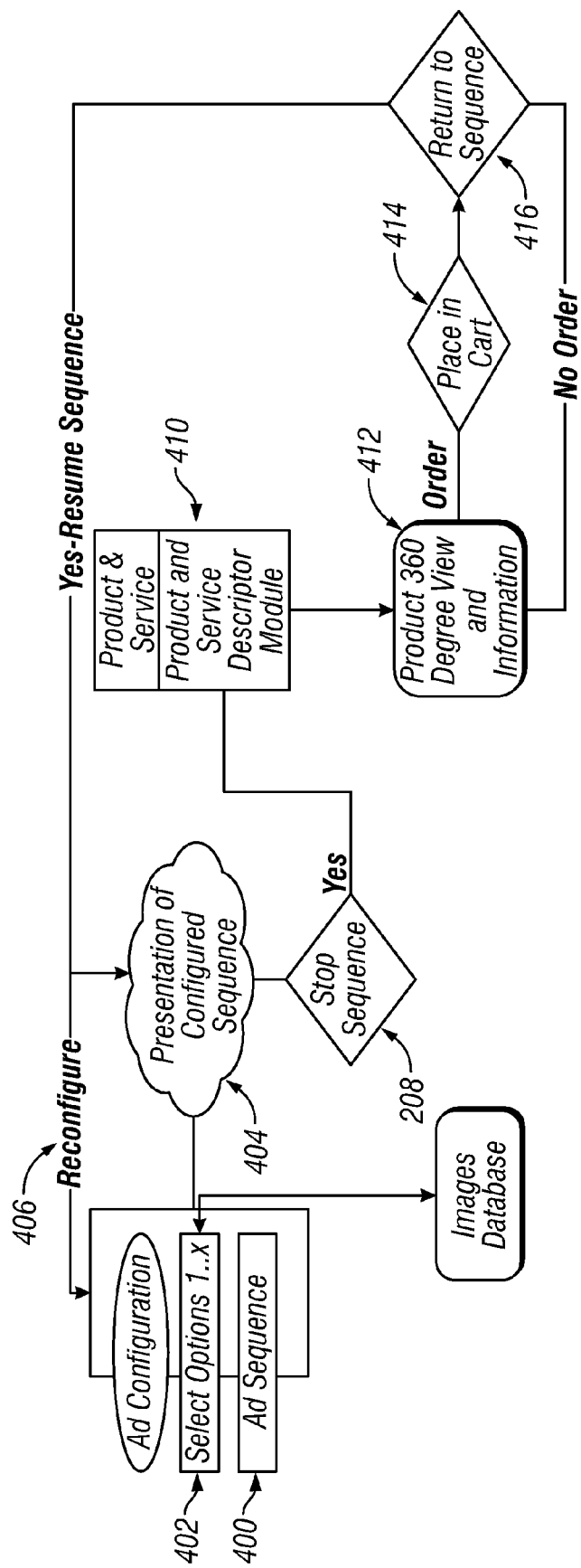
FIG. 3 illustrates a preferred method of configurable immersive advertising in accordance with the present invention.

FIG. 3 illustrates a preferred method of Immersive advertising according to the present invention. The method may take place on a wide area computer network such as the Internet or the World Wide Web and includes storing an advertising sequence in memory, step 400. This advertising sequence includes a plurality of single frame primary image models and a plurality of fill images that are configurable within the primary image models. A user interface is provided, which interface may be a web page or a specially designed interface application program that allows a user to selectively configure the fill images within the primary image models, step 402. In so doing, the advertising sequence may be customized based upon the user's selective configuration. The advertising sequence may then be displayed on a presentation web page, step 404. A user may then either reconfigure the advertising sequence, step 406, or stop the advertising sequence, step 408. A Product and Service Descriptor Module will then provide more detailed information about the products and services advertised, step 410.

An optional 360 degree view of the primary image model may also be provided, step 412. A user may then select the product or service for purchase, step 414, and, if desired, begin the process again, step 416.

Figure 4:
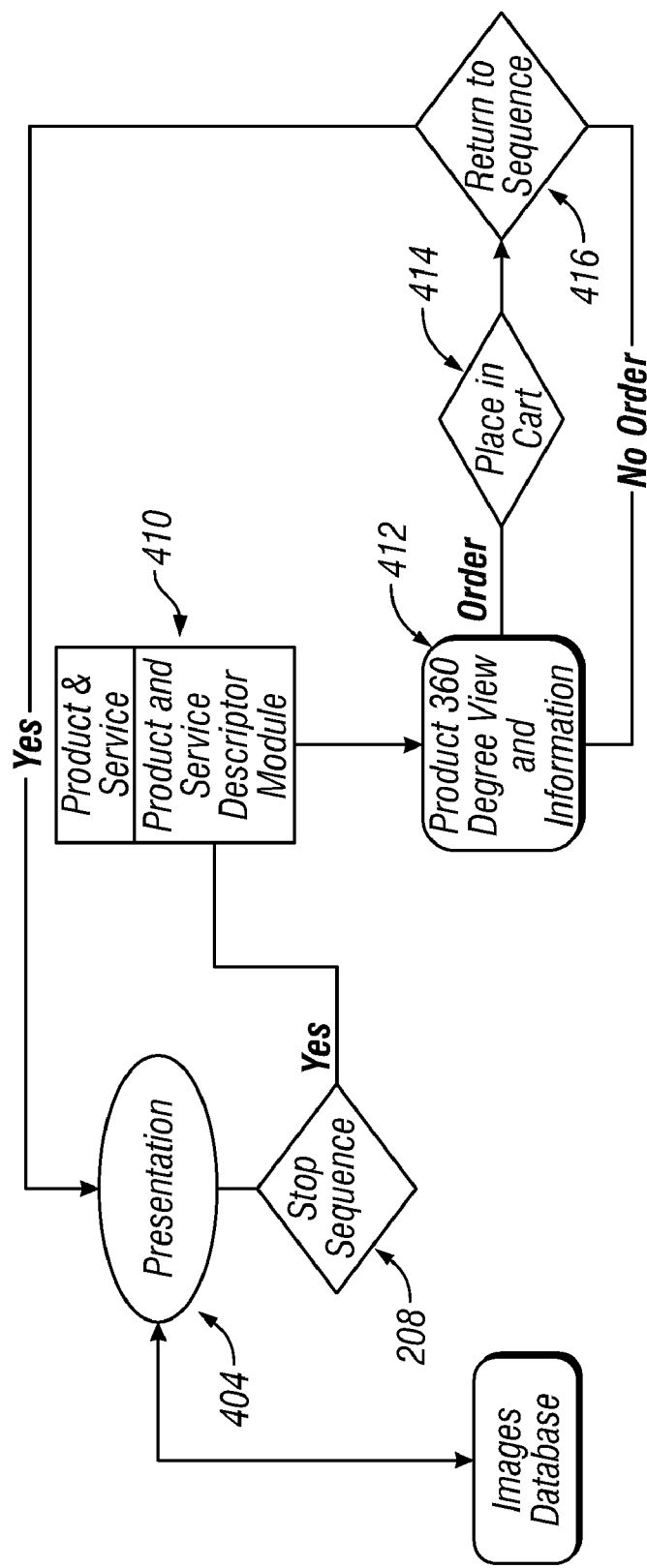
FIG. 4 illustrates a preferred method of non-configurable immersive advertising in accordance with the present invention.

FIG. 4 illustrates an alternate preferred method of Immersive advertising. In FIG. 3, a non-configurable method of Immersive advertising is shown, and otherwise, like numbers refer to like aspects of the present invention.

FIGS. 5A-5D and 6A-6E are successive screen displays further illustrating Immersive advertising in accordance with the present invention. Many alternative formats to the Immersive advertising invention are possible and FIGS. 5A-6E are only representative examples. As shown, Immersive advertising allows a user to select (or enter) various preferences regarding featured products or services. These preferences include not only broad selections such as category of product or service but also more specific preferences such as specific brands within the category, specific models of a particular brand, and even specific colors or other fine details of a particular model. Once all of these selections are made, an advertising sequence customized for the user is displayed. This display can include a 360 degree view of the product or of specific aspects of the product.

Figure 5A:
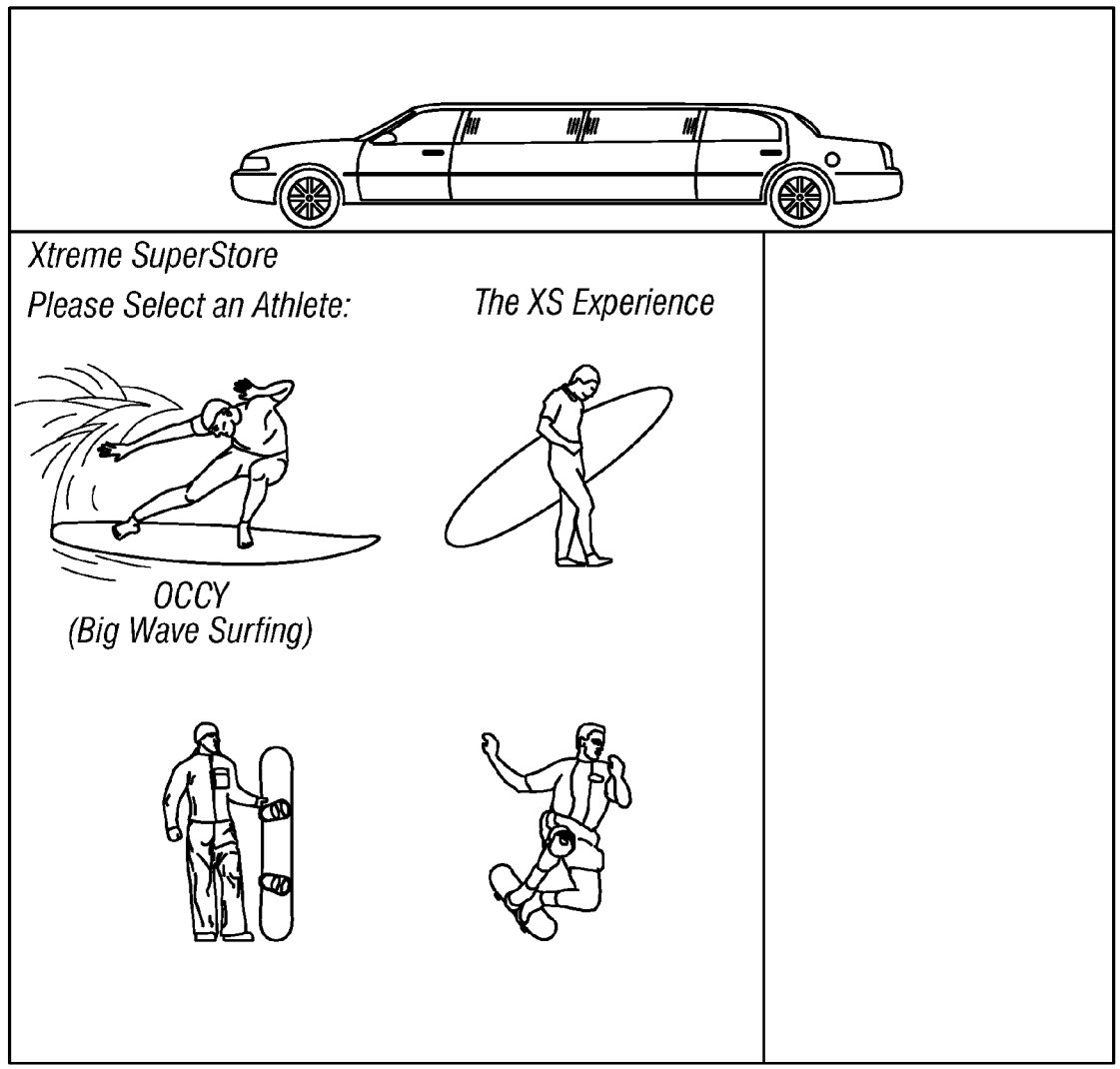
FIG. 5A is a screen display illustrating a user interface web page for selecting a configurable primary image model.
Figure 5B:
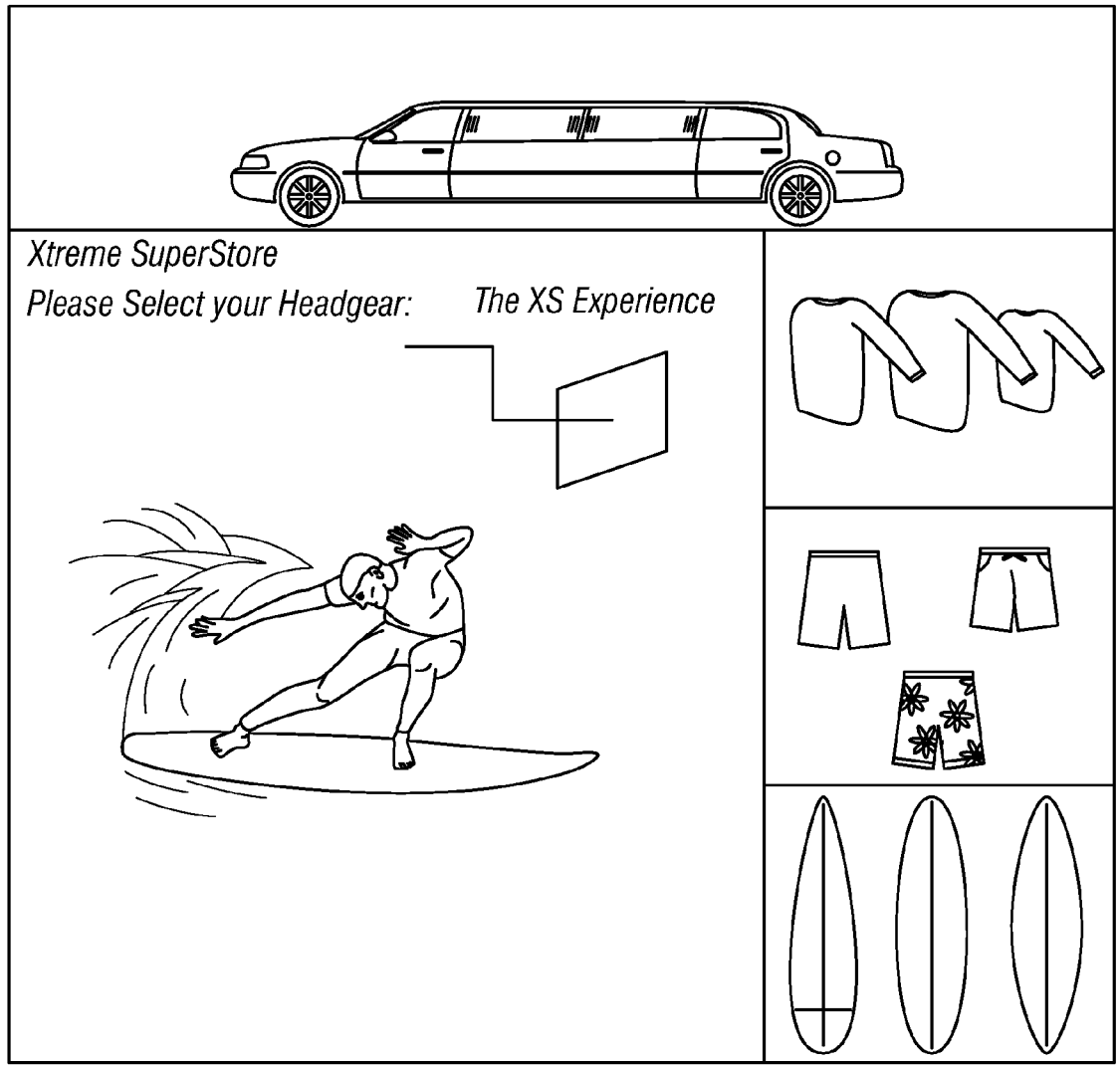
FIG. 5B is a screen display illustrating a user interface web page for selecting a series of fill images to be displayed within the primary image model.
Figure 5C:
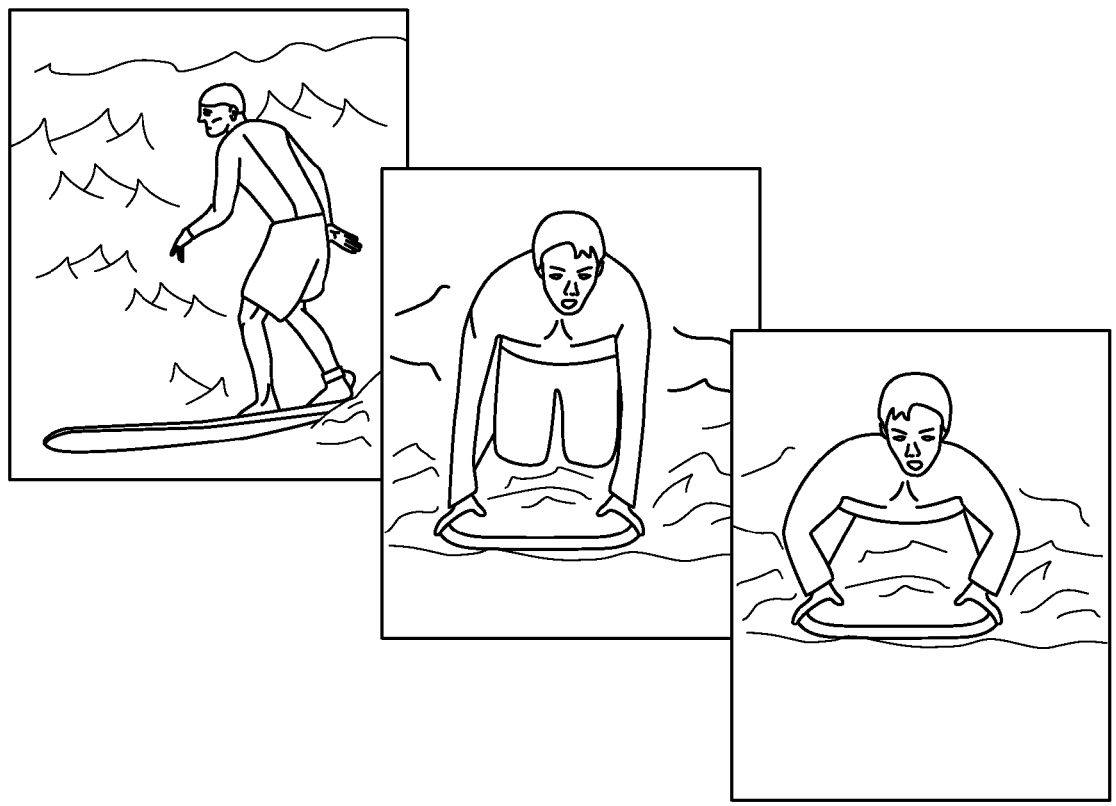
FIG. 5C is a screen display illustrating a presentation web page of the present invention.

For example, FIGS. 5A-5D depict a method and system where a user can view sporting equipment, such as surf boards and surf gear, and board shorts. In FIG. 5A, a user can chose from one of four athletes: a surfer, a skate boarder, a sky diver, or a wake boarder. If the user clicks on the surfer, the page depicted in FIG. 5B is delivered to the user's computer terminal. Now the user can chose one of among three wet suits, three board shorts, and three surf boards. The user can make his or her selections from among the displayed products, and a multi-media presentation of a surfer using those products is delivered to the user as shown in FIG. 5C. The multi-media presentation can be a sequence of still photographs, a video or film clip, or a sequence of computer generated images or digitized hand-drawn graphics.

Thus, in this example, the user can chose among twenty-==seven different combinations of products to customize the multi-media presentation. The specifications, such as size and color, of each product can also be modified by the user during his or her customization of the multi-media presentation. Furthermore, the customized product or service can be viewed by the user in a virtual environment wholly or partially controlled by the user/consumer. The virtual environment can be a three-dimensional advertising sequence. For example, the user can direct the video or film clip in real-time by viewing it from different angles or perspectives, or by directing the movement of the surfer and instructing the surfer, for example, to do various tricks. The user can view this interactive advertising sequence from the perspective of an actor within the virtual environment. Or the user can view the advertising sequence from the perspective of an outsider.

This level of interaction, not only increases the amount of exposure that the user gets to the products being advertised, but makes the advertisement much more exciting and interesting. The modifications of the interactive advertisement will only be limited by the capabilities of the product in non-virtual real environments, thus allowing a consumer to be creative and enjoy the immersive advertising experience.

For example, these systems and methods enable a user/consumer to test drive a car chosen from a database of options, in a three-dimensional virtual environment. A graphical user interface will allow the remote user to control the direction and speed of the car as well as the virtual camera view position. Thus, the user can test drive the car from a behind the wheel view or from any position outside the car.

Another illustrative example involves interactive advertisements of medical and dental devices. In this example, a remote user can view an interactive advertisement of a dental drill, for example. The dental drill may contain options, and the remote user can assemble the drill from its component options to create a drill of choice. The remote user can then view the drill from any angle by using a graphical user interface that enables the user to view the drill from any virtual camera angle. The user can then actually use the dental drill in an interactive, three-dimensional, virtual environment. An advertising sequence can be provided from a database of advertising sequences. The user can control the advertising sequence by directing the virtual camera angle, the specifications of the product being advertised, choosing between different products, and directing the actions of virtual actors.

Figure 5D:
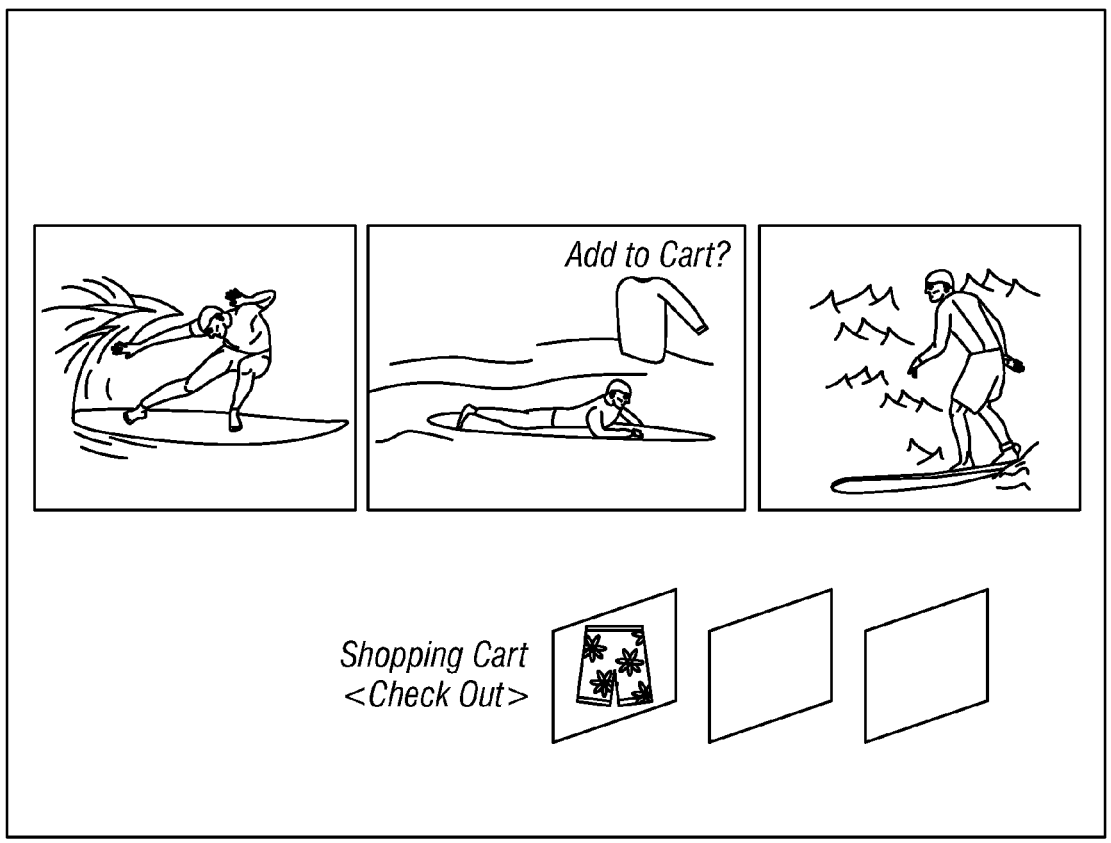
FIG. 5D is a screen display illustrating a user interface web page for selecting products to be purchased.

Then, as shown in FIG. 5D, the user can be offered the chance to purchase any or all of the products and services displayed in the interactive, multi-media presentation.

Figure 6A:
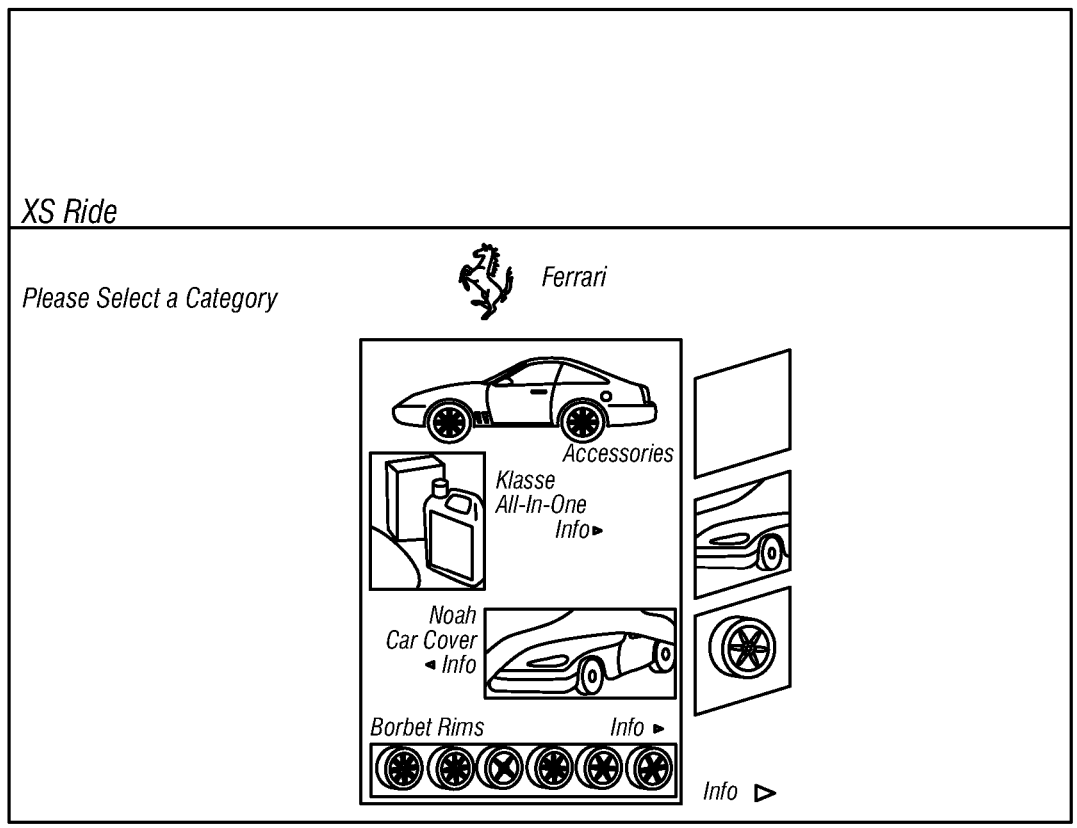
FIG. 6A is a screen display illustrating a user interface web page for obtaining additional information about related products.
Figure 6B:
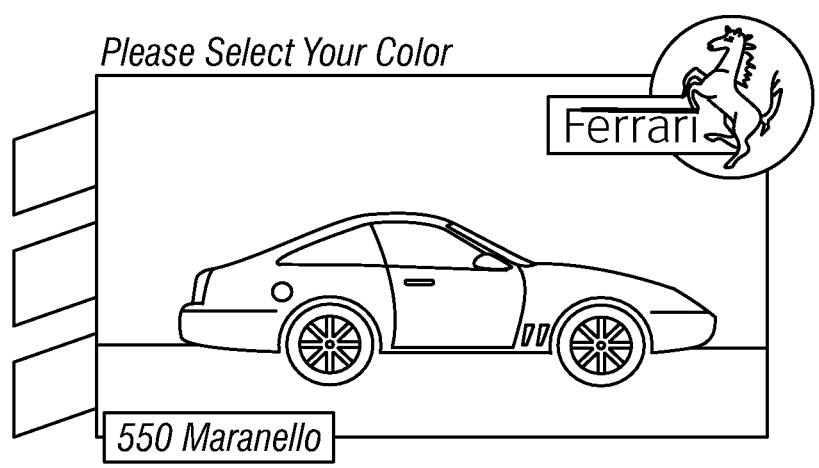
FIG. 6B is a screen display illustrating a user interface web page for selecting a dynamically altered image component that can serve as a fill image to be displayed within the primary image model.
Figure 6C:
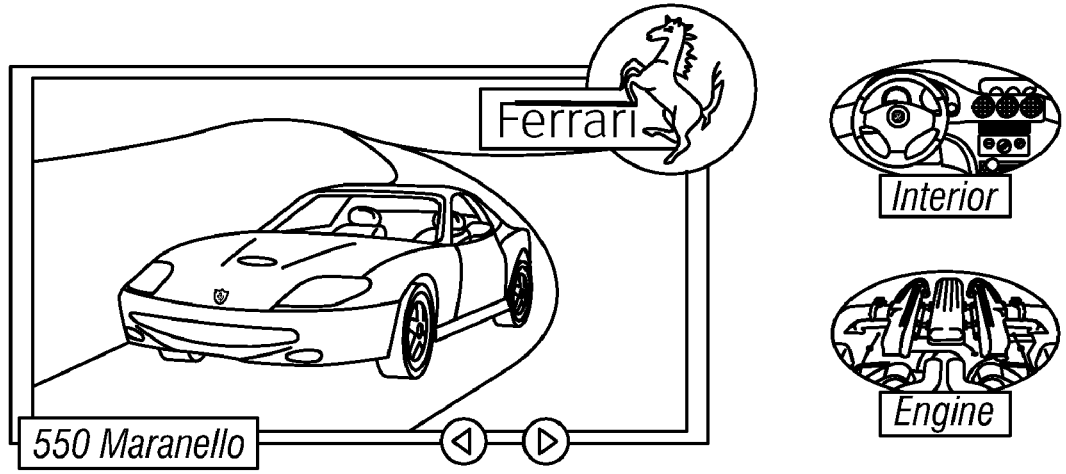
FIG. 6C is a screen display illustrating a presentation web page of the present invention.
Figure 6D:
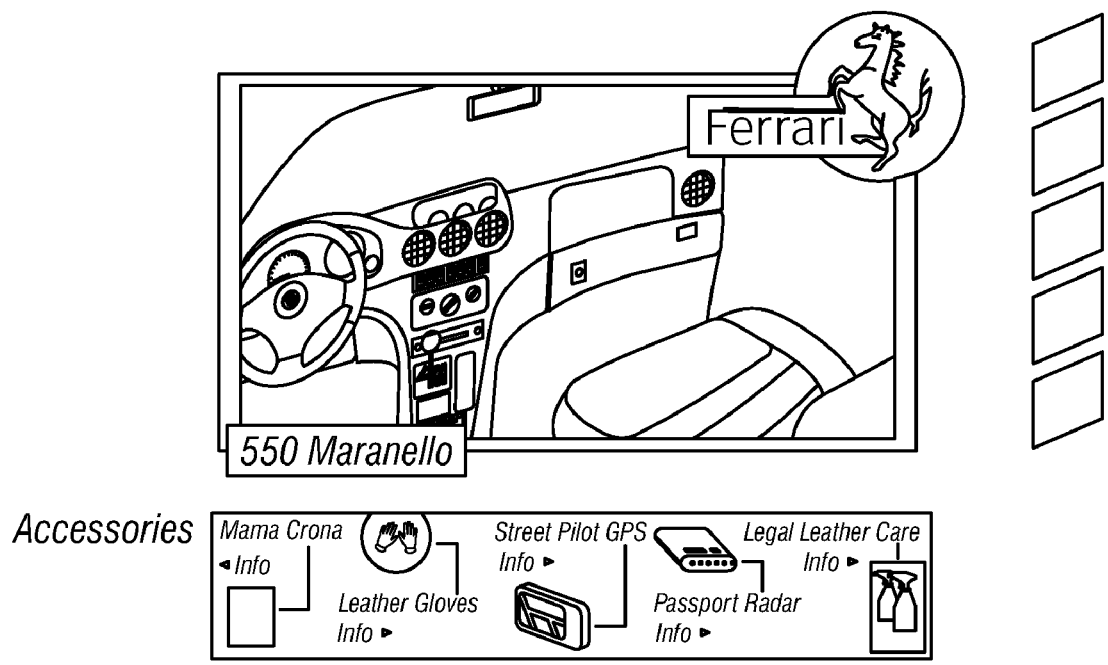
FIG. 6D is a screen display illustrating a presentation web page featuring a 360 degree image.

FIGS. 6A-6E show a method and system that enables a remote user/consumer to build his or her own car, and to then test drive it in a dynamic, virtual environment. In FIG. 6A, the user has already chosen a Ferrari (Registered trademark of Ferrari North America and Ferrari S.P.A.). Now the user/consumer can choose among a plurality of accessories, such as style of rims to place on the Ferrari. Then, as shown in FIG. 6B, which is an active server page, the user is given the opportunity to chose a color in which the car is offered; red, black or white. FIG. 6C shows that the user has chosen red, and is now given the opportunity to modify the interior of the car and the engine specifications of the car. If he clicks on "interior", he gets a closer look at the interior of the car (FIG. 6D), and can modify the interior specifications by clicking on one of the accessories provided beneath the photograph of the interior or by clicking on the desired component within the photograph of the interior. For example, he can click on the stereo, and be provided with a number of stereo options with which to modify his customized car. The modifications can be made in a dynamic setting enabled by an active server page.

Figure 6E:
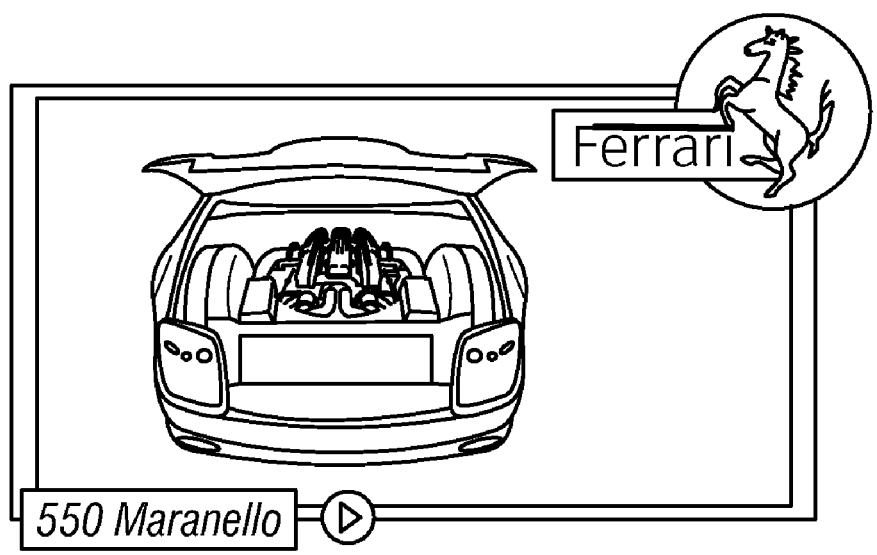
FIG. 6E is a screen display illustrating a presentation web page featuring a viewer movable component within the primary image model.

If the user/consumer clicks on "engine" in FIG. 6C, then the page shown in FIG. 6E will be delivered to the user's terminal. The user can zoom in on any component within the engine bay and dynamically remove that component and view it from any angle or perspective in real-time.

Finally, in an interactive multi-media presentation, the user is able to drive the car in one of a number of dynamic, virtual environments. The user can chose the virtual environment and then test drive the customized car as if he were in it and driving it himself. A graphical user interface is provided that enables the user to control the speed and direction of the car as well as the view or perspective from which the user views the interactive multi-media presentation of the car.

The methods and systems described herein can be used to advertise any product or service. Among them are clothing, shoes and accessories; cars and car products and accessories; motorcycles and motorcycle gear and accessories; watercraft; medical and surgical devices and instruments; cosmetics; household products; furniture; writing instruments; office supplies and equipment; sports equipment and gear; electronic equipment; scientific instruments; food items and recipes; tours of restaurants; and travel tours among other products and services not listed.

Although specific examples have been shown in the drawings and described in detail in the specification, the invention is susceptible to alternative forms and methods. Therefore, the invention is not limited to the particular forms or methods disclosed, but instead, covers all modifications, equivalents, and alternatives within the scope of the claims that follow.

We claim:

1. A system for immersive advertising comprising:
   a computer including: advertising information stored in a memory, said sequence comprising a plurality of primary image models which primary image models are partial images that include locations and places that are filled in within the image models; and an image database, said database comprising a plurality of fill images which are selected to fill in said locations and places within the image models; and a graphical user interface in communication with the computer, said graphical user interface enabling a user to configure said advertising sequence by selecting an image model, and by customizing said image model by filling in said image model using only selected fill images from said image database filled into said primary image model, wherein said graphical user interface allows the user to select one or more fill images to be displayed within said primary image models.

2. The system for immersive advertising as claimed in claim 1 further comprising a display subsystem operating to present said advertising sequence to the user.

3. The system for immersive advertising as claimed in claim 1 wherein said primary image models comprise video images.

4. The system for immersive advertising as claimed in claim 1, further comprising a shopping cart which allows purchasing of items, at least a plurality of said fill items represent items for sale, and wherein said graphical user interface further comprises automatically adding items corresponding to all of the selected fill items that are currently being displayed, to said shopping cart.

5. The system for immersive advertising as claimed in claim 1 wherein said primary image models comprise still frame images.

6. The system of immersive advertising as claimed in claim 1 wherein said primary image models are computer generated.

7. The system of claim 3, 4, 5, or 6 wherein said primary image models are three dimensional.

8. The system for immersive advertising-as claimed in claim 1 wherein said plurality of fill images comprise still frame images.

9. The system for immersive advertising as claimed in claim 1 wherein said plurality of fill images comprise dynamically altered image components of said plurality of single frame primary image models.

10. The system for immersive advertising as claimed in claim 1 wherein the fill images are images of products for advertising.

11. The system for immersive advertising as claimed in claim 10, wherein the graphical user interface is further capable of enabling a user to view the product from a plurality of perspectives in real time.

12. A system for immersive advertising on a wide area network comprising:

a graphical user interface;

a memory for storing an advertising sequence, said sequence comprising a plurality of primary image models which each have places in the image models that allow other images to be placed therein;

an image database, said database comprising a plurality of fill images, at least a plurality of said fill images representing items for sale that are associated with said image models;

an application server in electronic communication with each of said user interface, said memory, and said image database;

a logic program which enables user interaction with said system; and a presentation web page for displaying said advertising sequence to the user, wherein said logic programs allows said user to select fill images to be displayed within and as part of said primary image models.

13. A system for immersive advertising on a wide area network as claimed in claim 12 wherein said primary image models comprise video images.

14. A system for immersive advertising on a wide area network as claimed in claim 12 wherein said application server further comprises a shopping cart which allows purchasing of items, and wherein at least a plurality of said fill items represent items for sale, and said application server further comprises allowing automatically adding items corresponding to all of the selected fill items that are currently being displayed, to said shopping cart.

15. A system for immersive advertising on a wide area network as claimed in claim 12 wherein said primary image models comprise still frame images.

16. The system of immersive advertising as claimed in claim 12 wherein said primary image models are computer generated.

17. The system of claim 13, 14, 15, or 16 wherein said primary image models are three dimensional.

18. A system for immersive advertising on a wide area network as claimed in claim 12 wherein said plurality of fill images comprise still frame images.

19. A system for immersive advertising on a wide area network as claimed in claim 12 wherein said plurality of fill images comprise dynamically altered image components of said plurality of single frame primary image models.

20. A system for immersive advertising on a wide area network as claimed in claim 12 wherein the graphical user interface is capable of enabling a user to view the product from a plurality of perspectives in real time.

21. A system for immersive advertising on a wide area network as claimed in claim 20 wherein VRML is used to view the product from a plurality of perspectives in real time.

22. A method of immersive advertising on a wide area computer network, the method comprising the steps of:

storing an advertising sequence in memory, said advertising sequence comprising a plurality of primary image models which are partial images that include locations and places that are filled in within the image models and a plurality of fill images configurable within said primary image models and wherein said fill images are selected to fill in said locations and places within the image models, and wherein at least a plurality of said fill images represent items for sale that are associated with said image models;

displaying a selected primary image model and a plural selected fill images on a graphical user interface;

using a logic program in communication with the graphical user interface, to select fill images and to use only selected said fill images within said primary image models;

customizing, using the logic program, said advertising sequence based upon the user's selective configuration; and displaying said advertising sequence on a presentation web page.

23. The method of immersive advertising on a wide area computer network as claimed in claim 22 further comprising forming a shopping cart which allows purchasing of items, and automatically adding items corresponding to all of the selected fill items that are displayed as part of said displaying, to said shopping cart.

24. The method of immersive advertising on a wide area computer network as claimed in claim 22 further comprising the step of allowing the user to reconfigure the advertising sequence.

25. The method of immersive advertising on a wide area computer network as claimed in claim 22 further comprising the step of allowing the user to pause the advertising sequence.

26. The method of immersive advertising on a wide area computer network as claimed in claim 25 further comprising the step of providing a description of products and services displayed in the advertising sequence.

27. The method of immersive advertising on a wide area computer network as claimed in claim 22 further comprising the step of allowing the user to decrease the time elapsed between the frames of an advertising sequence.

28. A method of immersive advertising on a wide area computer network comprising the steps of:

receiving, using a computer, a request from a remote user to view a first product;

using said advertising sequence to access comprising a plurality of primary image models which are partial images that include locations and places that are filled in within the image models and a plurality of fill images configurable within said primary image models which are selected to fill in said locations and places within the image models, and wherein at least a plurality of said fill images representing items for sale that are associated with said image models;

displaying a selected primary image model and a plural selected fill images to deliver, using a computer, an interactive multi-media presentation to the user's computer, said multi-media presentation comprising a plurality of images of said first product in use via said fill images;

using a graphical user interface (GUI) for use by the remote user, said GUI comprising controls to modify the multi-media presentation;

receiving, using a computer, an instruction from the remote user to modify the multi-media presentation; and modifying, using a computer, the multi-media presentation in real-time to comply with the remote user's instruction; and automatically adding each of the fill items which are currently being viewed at places within the image model to a shopping cart as part of a purchase to be made; and allowing checkout and purchase of each of the fill items in said shopping cart.

29. The method of claim 28, wherein the remote user's instruction is to modify a specification of the first product.

30. The method of claim 28, wherein the remote user's instruction is to remove the first product from the presentation and to insert a different product into the presentation.

31. The method of claim 28, wherein the remote user's instruction is to modify the perspective of the presentation, so that the first product can be viewed in real-time from a different perspective.

32. The method of claim 28, wherein the remote user's instruction is to view the presentation from a plurality of perspectives, simultaneously.

33. The method of claim 28, wherein the remote user's instruction is to speed up the presentation.

34. The method of claim 28, wherein the remote user's instruction is to pause the presentation.

35. The method of claim 28, wherein the remote user's instruction is to slow down the presentation.

36. The method of claim 28, wherein the remote user's instruction is to view the first product in combination with a second complementary product, wherein the second complementary product is a component of the first product.

37. The method of claim 36, wherein the remote user's instruction is to replace the second complementary product with a third complementary product, wherein the third complementary product is a component of the first product.

38. The method of claim 28, wherein the multi-media presentation comprises computer generated images.

39. The method of claim 38, wherein the multi-media presentation is a film clip.

40. The method of claim 38, wherein the multi-media presentation is a video clip.

41. The method of claim 38, wherein the multi-media presentation is a sequence of photographs.

42. The method of claim 28, wherein the multi-media presentation comprises a three dimensional virtual environment.

43. The method of claim 42, wherein the graphical user interface is capable of enabling the user to navigate through the three dimensional virtual environment, to view said first product from a plurality of perspectives, and to control the use of said product in the virtual environment.

* * * * *